United States Patent

Harada et al.

[11] Patent Number: 5,733,684
[45] Date of Patent: Mar. 31, 1998

[54] ELECTRODE SUBSTRATE FOR BATTERY AND PROCESS FOR PREPARING THE SAME

[75] Inventors: Keizo Harada; Kenichi Watanabe; Shosaku Yamanaka, all of Itami, Japan

[73] Assignee: Sumitomo Electric Industries, Ltd., Japan

[21] Appl. No.: 652,090

[22] Filed: May 23, 1996

[30] Foreign Application Priority Data

Jun. 19, 1995 [JP] Japan ................................. 7-151702
Jul. 24, 1995 [JP] Japan ................................. 7-187059
Oct. 3, 1995 [JP] Japan ................................. 7-256266
Apr. 15, 1996 [JP] Japan ................................. 8-092655

[51] Int. Cl.$^6$ ................................................. H01M 4/32
[52] U.S. Cl. .................... 429/223; 429/233; 429/234; 429/235; 429/236; 429/237; 429/245; 204/290 R; 204/292; 204/286
[58] Field of Search ................... 429/223, 233–237, 429/221, 245; 204/290 R, 292, 286

[56] References Cited

U.S. PATENT DOCUMENTS 3,055,963 11/1958 Krebs ................................. 429/245

FOREIGN PATENT DOCUMENTS

| 0079666 | 5/1983 | European Pat. Off. . |
|---|---|---|
| 0643432 | 3/1995 | European Pat. Off. . |
| 0710995 | 5/1996 | European Pat. Off. . |
| 17554 | 9/1963 | Japan . |
| 56-026367 | 3/1981 | Japan . |
| 57-072269 | 5/1982 | Japan . |
| 174484 | 10/1982 | Japan . |

OTHER PUBLICATIONS

Derwent publication 82-02770E (1 page) Apr. 19, 1980.

*Primary Examiner*—Bruce F. Bell
*Attorney, Agent, or Firm*—Bierman, Muserlian and Lucas

[57] ABSTRACT

An electrode substrate, for a battery, as a support for an active material used in a collector for a battery, comprising a metallic porous structure possessing interconnecting pores with a porosity of not less than 90% and a number of pores per cm of not less than 10 and having an Fe/Ni two-layer structure wherein Fe constitutes the interior of a skeleton of a porous body constituting the porous structure with the surface portion of the skeleton coated with Ni. Preferably, Fe constituting the interior of the skeleton has a purity of not less than 98% by weight, and the thickness of the nickel coating layer having an Fe content of not more than 10% by weight is 0.1 to 10 μm. The ratio of thickness of the Fe-diffused layer to the thickness of the Ni coating layer is regulated to not more than 0.65 by forming a metallic porous body of Fe using a porous resin as a substrate, plating the metallic porous body with Ni, heat treating the plated body.

8 Claims, No Drawings with 5,733,684

ELECTRODE SUBSTRATE FOR BATTERY AND PROCESS FOR PREPARING THE SAME

BACKGROUND OF THE INVENTION

1. Field of the Invention

The present invention relates to an electrode substrate for alkaline storage batteries, such as a nickel-cadmium battery, a nickel-zinc battery, and a nickel-hydrogen battery.

2. Description of the Prior Art

Storage batteries which have been used in various power sources are a lead storage battery and an alkaline storage battery. Of these batteries, the alkaline storage battery have been used widely in various types of portable equipment in the case of a small battery and in industries in the case of a large battery for reasons including that high reliability could be expected and a reduction in size and weight is also possible. In the alkaline storage batteries, zinc, iron, hydrogen, etc. besides cadmium are used as a negative electrode. On the other hand, the positive electrode is, in most cases, a nickel electrode although an air electrode or a silver oxide electrode has been partly accepted. Conversion from a pocket type to a sintering type resulted in improved properties of the alkaline storage battery, and that hermetic sealing has become possible expanded the applications of the alkaline storage batteries.

Meanwhile, a foam or fibrous Ni substrate having a high porosity of not less than 90% has been adopted as an electrode for batteries and contributed to an increase in capacity of batteries. As methods for preparing the above porous Ni substrate having a high porosity, there are known a plating method disclosed in Japanese Patent Laid-Open No. 57-174484 and a sintering method disclosed in Japanese Patent Publication No. 38-17554. In the plating method, the surface of a skeleton of a foam resin, such as a urethane foam, is coated with a carbon powder or the like to render the resin conductive, Ni is electrodeposited on the conductive surface of the resin by electroplating, and the foam resin and carbon are then removed, thereby preparing a metallic porous body. On the other hand, in the sintering method, a slurried Ni powder is impregnated into the surface of the skeleton in a foam resin, such as a urethane foam, and the impregnated foam resin is then heated to sinter the Ni powder.

As described above, the application of a porous Ni body to an electrode substrate for a battery has contributed greatly to an increase in capacity of the battery. However, the Ni metal is expensive, and, when the above alkaline storage battery is adopted for electric cars in the future, the amount of Ni used is expected to become very large, posing a problem of resources.

The present invention has solved the above problems by adopting an Fe/Ni two-layer structure.

Regarding metallic porous structures having an Fe/Ni two-layer structure, the use of such structures for sterilization purposes has been disclosed, for example, in Japanese Patent Laid-Open No. 2-93006. The structure disclosed in this publication is prepared by providing a urethane foam as a skeleton, coating the urethane foam with an Fe powder, further top coating the surface of the Fe coating with a kneaded product of Ni, Cr and/or Cu, and heating the coated urethane foam in an oven for heat treatment, thereby providing a corrosion-resistant coating layer of Ni, Cr and/or Cu on the Fe skeleton. Further, a metal having bacteriocidal activity (Au, Cu and/or Ag) is further applied thereon by plating, dipping, thermal spraying or the like. In this case, since the structure is used for sterilization purposes, the structure has a two-layer structure of an Fe layer and a metallic layer having bacteriocidal activity or a three-layer structure of an Fe layer, a corrosion-resistant coating layer, and a metallic layer having bacteriocidal activity. It is different from the substrate for batteries in specifications and, hence, as such cannot be applied to a substrate for batteries.

As described above, regarding conventional metallic porous structures having an Fe/Ni two-layer structure, the use of such structures for sterilization purposes is disclosed, for example, in Japanese Patent Laid-Open No. 2-93006. However, the prior art as such cannot be applied to an electrode substrate for batteries. Specifically, properties required of the metallic porous body having an Fe/Ni two-layer structure when used as an electrode substrate for batteries include: (1) the porosity which greatly affects the amount of filling of an active material, i.e., a factor which determines the charge-discharge capacity of the battery, should be high; (2) the electric resistance which determines current collecting performance of the active material should be low; and (3) the influence of Fe eluted by corrosion on the battery performance characteristics should be prevented. Only metallic porous bodies which have been closely controlled for these various properties can be applied to a substrate for batteries. In the above cited technique for sterilization purposes, the porosity corresponding to the above (1) is not specified. Regarding the above (2), the purity of the metal constituting the skeleton is very important, and a particularly high purity is required for the Fe portion as the main skeleton. In the prior art, however, the raw material powder has high C and O contents, making it impossible to provide low electric resistance required of the plate for batteries. Furthermore, the prior art does not specify the above (3) as well. For the above reason, the application of the prior art per se does not offer properties desired in the battery.

SUMMARY OF THE INVENTION

The present invention relates to an electrode substrate, for a battery, as a support for an active material used in a collector for a battery, comprising a metallic porous structure possessing interconnecting pores with a porosity of not less than 90% and a number of pores per cm of not less than 10 and having an Fe/Ni two-layer structure wherein Fe constitutes the interior of a skeleton of a porous body constituting the porous structure with the surface portion of the skeleton coated with Ni.

The provision of the Fe/Ni two-layer structure constituted by a metallic porous structure possessing interconnecting pores with a porosity of not less than 90% and a small pore size, that is, a number of pores per cm of not less than 10 results in improved capability of holding an active material for a battery, enabling a larger amount of active material to be filled into the structure. This in turn can improve the charge-discharge cycle life and the capacity of the battery.

Electroplating is best suited for coating Fe with Ni. In this case, preferably, Ni plating is evenly applied onto the porous body of Fe with the surface area of exposed Fe portion being not more than 10% based on the total surface area of the porous body. The proportion of the exposed Fe portion should be essentially zero. In fact, however, it is difficult to bring the proportion to zero in the actual preparation thereof, and the exposure of Fe to some extent is unavoidable. The exposed Fe portion, however, is attacked by an alkaline electrolyte within a battery, causing self-discharge due to elution of Fe, deteriorated service life, deterioration in current collecting properties due to the formation of a passive film and the like. This leads to lowered battery performance characteristics. The present inventors have investigated the influence of the area of the Fe exposed portion, based on the total surface area of the porous body, on the battery performance characteristics and, as a result, have found that an area proportion of Fe exposed portion of not more than 10% causes no significant deterioration in battery performance characteristics. When the area proportion of Fe exposed portion is not more than 3%, the elution of Fe can also be suppressed, offering better results.

According to the present invention, Fe is coated with Ni, and in the Fe/Ni two-layer structure, the thickness $T_{Ni}$ of the nickel coating layer and the thickness $D_{Fe}$ of a diffused layer of iron diffused into the nickel coating layer preferably satisfies a relationship represented by the following formula:

$$0 < D_{Fe}/T_{Ni} \leq 0.65$$

This can be controlled by heat treatment conditions after coating Fe with Ni. When an Fe/Ni two-layer structure is merely formed, the Ni coating layer thus obtained is hard and cannot be elongated, posing a problem associated with filling of an active material in the step of assembling a battery and a problem of breaking or the like in the working such as winding of the electrode. Solution of these problems needs heat treatment. The heat treatment, however, inevitably results in diffusion of Fe into the Ni layer. The alloying of Ni with Fe by the diffusion of Fe leads to an increase in electric resistance. Although the heat treatment is necessary, when the ratio of the thickness of the diffused layer of iron to the thickness of the Ni layer exceeds 65%, increased electric resistance, lowered mechanical properties and lowered corrosion resistance attributable to the alloying of Ni with Fe occur. The control of the diffusion of iron into the nickel coating layer can be easily carried out by controlling the temperature and the time of the heat treatment. Although conditions for the heat treatment vary depending upon the thickness of the nickel coating layer, they are preferably such that the heat treatment temperature is 700° C. or below with the heat treatment time being 1 to 30 min.

An increase in Fe content in Ni leads to an increase in electric resistance due to alloying of Ni with Fe and, at the same time, deteriorates the elongation property as a mechanical property. When the Fe content is further increased, the corrosion resistance is also deteriorated. For this reason, the Fe content in the Ni coating layer is preferably not more than 10% by weight. The Fe content is still preferably not more than 4% by weight.

Since Fe used in the present invention serves as a current passage in a plate for a battery, lower electric resistance offers better results. For attaining this purpose, not less than 98% by weight of the interior of the Fe skeleton is preferably constituted by Fe. Further, when the amount of the impurity is large, the elongation property among the strength properties of the Fe skeleton portion is deteriorated, making it very difficult to assemble a plate for a battery. For this reason as well, not less than 98% by weight of the interior of the Fe skeleton is preferably constituted by Fe.

Further, that the thickness of the nickel coating layer excluding the Fe exposed portion is 0.1 to 10 µm is cost-effective and, at the same time, can provide a metallic porous body having satisfactory corrosion resistance. When the thickness is less than 0.1 µm, the corrosion resistance is unsatisfactory. On the other hand, when it exceeds 10 µm, the amount of Ni used becomes large, which is apart from the object of the present invention, that is, the provision of a metallic porous body which is cost-effective and can solve the problem of resources. The thickness of the Ni coating layer is still preferably 0.1 to 5 µm.

The above metallic porous body having an Fe/Ni two-layer structure may be prepared by forming a metallic porous body of Fe using a porous resin as a substrate, plating the metallic porous body with nickel to form an Ni coating layer, and heat-treating the plated metallic porous body to regulate the ratio of the thickness of the diffused layer of iron diffused into the nickel coating layer to the thickness of the nickel coating layer to not more than 0.65. Regarding the production of the metallic porous body of iron used in the present invention, coating of a porous resin with an Fe metal powder followed by sintering is best suited for this purpose. A urethane foam is, of course, best suited as the porous resin. However, it is also possible to use a nonwoven fabric. Further, a method is also used wherein the above substrate is coated with carbon or the like to impart a conductive property to the substrate and the coated substrate is plated with iron. The substrate may also be a nonwoven fabric of a carbon fiber.

DETAILED DESCRIPTION OF THE PREFERRED EMBODIMENTS

Fe which is used as the base layer of the metallic porous body is inexpensive and rich in resources and, hence, can be supplied as an electrode substrate for batteries at a low cost in large quantities. The Ni coating on the surface of Fe is important because the corrosion resistance thereof in a strongly alkaline solution used in alkaline batteries is very good. Therefore, preferably, the surface of Fe is entirely covered with Ni. In this case, however, even though the whole surface of the porous skeleton of Fe is plated with Ni, it is difficult for Ni to penetrate into the interior of the porous body. Further, the presence of a residual stain or the like, created during sintering, on the surface of the porous body of Fe too results in difficulty of Ni plating. Since the Ni coating is formed by electroplating, that the Fe skeleton to be plated has a dense and smooth skeleton structure is important in order to solve the above problem. For this reason, when an Fe powder is applied onto a urethane foam and then heat-treated to form a sintered Fe porous body, it is preferred to use a powdery material having a particle size of preferably not more than 20 µm, still preferably not more than 3 µm. Specifically, solid phase diffusion should be promoted during sintering of Fe powder in order to densify the skeleton portion. The use of a powder having a small particle size which provides a large contact area among particles is useful for this purpose. The heat treatment temperature for sintering is preferably 1100° C. or above. This is because when the temperature is below 1100° C., no satisfactory solid phase diffusion occurs, making it impossible to attain densification/smoothing of the skeleton portion. Further, cleaning with an inorganic acid having a concentration of several percent can remove the stain and, at the same time, hydrophilize the surface of Fe. This facilitates the penetration of an Ni plating solution into the interior of the porous body. The concentration of the inorganic acid is preferably several percent, and the dipping time is preferably several minutes. Both excessively high acid concentration and excessively long dipping time unfavorably lead to the dissolution of the Fe skeleton. The above procedure can bring the area proportion of exposed Fe to not more than 10%. Since the electric resistance increases with lowering in the purity of Fe constituting the skeleton, the purity of Fe should be high. When the purity is not less than 98%, the electric resistance of the resultant electrode substrate becomes a value which substantially suffices for practical use.

Regarding the Ni coating layer, the diffusion of Fe constituting the base layer into the Ni coating layer should be small in view of two points, corrosion resistance to an alkaline electrolyte and electric resistance. Significant diffusion of Fe results in deteriorated corrosion resistance of the electrode substrate and, at the same time, increased electric resistance. As described above, the purpose of the diffusion of Fe into the Ni coating layer by heat treatment is to modify the hard and brittle state of as-formed Ni plating. The heat treatment accelerates the diffusion of Fe into the Ni layer. When the diffused Fe layer occupies all of the Ni layer, that is, 100% of the Ni layer, Ni is alloyed with Fe, causing increased electric resistance, deteriorated mechanical strength, and deteriorated corrosion resistance.

The present inventors have investigated in detail the relationship between the degree of the diffusion of Fe constituting the skeleton of the porous body into the nickel coating layer and the electric resistance, mechanical properties, and corrosion resistance to the alkaline electrolyte. As a result, they have found that the Ni layer consisting of pure Ni alone should occupy at least 35% of the whole Ni layer and, when the Ni plating has a thickness of not more than 1.0 µm, at least 50%, based on the whole Ni layer, of the Ni layer should consist of pure Ni alone from the viewpoints of electric resistance and excellent corrosion resistance. The thickness of the Ni plating may be selected according to service conditions of batteries, and a thick plating is generally used for applications where batteries are used under severe conditions such as rapid charge-discharge cycles, high temperatures, and very long service life.

EXAMPLE A

A polyurethane foam having a thickness and a number of pores as specified in Table 1 was provided as a starting material. It was impregnated and coated with a slurry prepared by mixing an Fe powder having an average particle size of 2 µm, an emulsion of an acrylic resin, CMC (dispersant), and water together in respective amounts of 60% by weight, 10% by weight (solid content), 1% by weight, and 29% by weight, and the coated polyurethane foam was dried at 120° C. for 10 min, thereby coating the polyurethane foam with an Fe powder. The polyurethane foam coated with the Fe powder was then heated and sintered in $H_2$ gas at 1250° C. for 20 min, thereby preparing a porous Fe body.

The Fe powder contained impurity elements as listed in Table 1.

The obtained porous Fe body was plated with Ni using a Watts bath at a current density of 10 A/dm$^2$ for a period of time as specified in Table 1 and then heat-treated in an $N_2$ gas atmosphere at a heat treatment temperature specified in Table 1 for 10 min, thereby preparing a metallic porous body having an Fe/Ni two-layer structure. Thus, nine samples listed in Table 1 were prepared and evaluated for properties. The results are given in Table 2. In this case, the porosity was measured by the water displacement method, the purity of the Fe skeleton portion was determined by chemical analysis, and the thickness of the Ni coating layer was determined by observation of the cross-section of the skeleton portion under an electron microscope and expressed in terms of average thickness of 10 points. Further, the Fe content in the Ni layer was determined by line analysis of the cross-section of the skeleton portion according to Auger electron spectroscopy (space resolving power 0.1 µm). The electric resistance is a value as measured on a sample having a length of 100 mm and a width of 10 mm.

TABLE 1

| Sample No. | Thickness of urethane (mm) | Number of pores in urethane (pores/cm) | Major impurity elements in Fe powder and concentration thereof (wt %) | Plating time (min) | Temp. of heat treatment after plating (°C.) |
|---|---|---|---|---|---|
| 1 | 3.5 | 12 | C(0.01), O(0.2), Mn(0.5), Si(0.3) | 10 | 550 |
| 2 | 3.5 | 12 | C(0.01), O(0.2), Mn(0.5), Si(0.3) | 10 | 700 |
| 3 | 3.5 | 12 | C(0.01), O(0.2), Mn(0.5), Si(0.3) | 10 | 800 |
| 4 | 3.5 | 12 | C(0.01), O(0.2), Mn(0.5), Si(0.3) | 10 | 550 |
| 5 | 1 | 12 | C(0.01), O(0.2), Mn(0.5), Si(0.3) | 10 | 550 |
| 6 | 3.5 | 4 | C(0.01), O(0.2), Mn(0.5), Si(0.3) | 10 | 550 |
| 7 | 3.5 | 12 | C(0.1), O(0.2), Mn(2.5), Si(2.1) | 10 | 550 |
| 8 | 3.5 | 12 | C(0.01), O(0.2), Mn(0.1), Si(0.1) | 10 | 1000 |
| 9 | 3.5 | 12 | C(0.01), O(0.2), Mn(0.5), Si(0.3) | 0.3 | 550 |

TABLE 2

| Sample No. | Porosity (%) | Number of pores (pores/cm) | Fe purity in skeleton portion layer (wt %) | Fe content in Ni layer (wt %) | Thickness of Ni layer (µm) | Electric resistance (mΩ) |
|---|---|---|---|---|---|---|
| 1 | 95 | 15 | 99 | 0.2 | 1.8 | 45 |
| 2 | 95 | 15 | 99 | 1.4 | 1.8 | 53 |
| 3 | 95 | 15 | 99 | 6.5 | 1.8 | 60 |
| 4 | 95 | 15 | 99 | 0.2 | 3.5 | 39 |
| 5 | 80 | 15 | 99 | 0.2 | 1.8 | 35 |
| 6 | 95 | 5 | 99 | 0.2 | 1.8 | 43 |
| 7 | 95 | 15 | 95 | 0.2 | 1.8 | 110 |

TABLE 2-continued

| Sample No. | Porosity (%) | Number of pores (pores/cm) | Fe purity in skeleton portion layer (wt %) | Fe content in Ni layer (wt %) | Thickness of Ni layer (μm) | Electric resistance (mΩ) |
| --- | --- | --- | --- | --- | --- | --- |
| 8 | 95 | 15 | 99 | 15 | 1.8 | 71 |
| 9 | 80 | 15 | 99 | 0.2 | 0.04 | 58 |

In Table 1, for all the samples, the weight per unit area (areal density) was about 600 g/m². For the sample No. 5, since the thickness of urethane was 1 mm, multi-coating with the slurry containing the Fe powder was conducted to regulate the areal density. This resulted in lowered porosity. There was a tendency that when the heat treatment temperature after plating was high, the Fe content in the Ni coating layer was increased, resulting in increased electric resistance (Samples 3 and 8). An increased impurity content in the Fe powder also caused increased electric resistance. When the thickness of the Ni coating layer was lowered, the electric resistance was increased due to a reduction in the proportion of cross-section of Ni having lower electric resistance than Fe. The sample No. 8 had increased electric resistance due to high content of Fe in Ni.

Metallic porous body samples 1 to 9, listed in Table 2, as prepared above were used to prepare nickel electrodes. The samples were filled with an active material composed mainly of nickel hydroxide, and the surface thereof was smoothed. They were then dried at 120° C. for 1 hr. The resultant electrodes were pressed at 1 ton/cm² into a size of 250 mm in longitudinal length×150 mm in lateral width×0.7 mm in thickness.

Five sheets of the nickel electrode, five sheets of a metal-hybrids electrode, based on conventional MmNi (misch metal nickel), as a counter electrode, and a hydrophilized polypropylene nonwoven fabric separator were used to construct an angular enclosed nickel-hydrogen battery. A 25 g/liter solution of lithium hydroxide dissolved in an aqueous caustic potash solution having a specific gravity of 1.25 was used as an electrolyte. The batteries thus obtained were designated as battery Nos. 1B, 2B, 3B, . . . which correspond to the sample Nos. of the metallic porous bodies listed in Table 2. Further, as Reference Example 1, the above procedure was repeated to prepare a battery using a nickel electrode comprising the conventional porous Ni body.

For each battery, the discharge voltage and the capacity were investigated at discharge currents of 10 A and 150 A. Further, each battery was tested on the service life by determining the retention of capacity after 500 charge-discharge cycles at a discharge current of 10 A. The results are given in Table 3.

TABLE 3

| Battery No. | Discharge at 10 A | | Discharge at 150 A | | Retention of capacity after 500 cycles (%) |
| --- | --- | --- | --- | --- | --- |
| | Voltage (V) | Capacity (Ah) | Voltage (V) | Capacity (Ah) | |
| 1B | 1.23 | 104 | 1.16 | 100 | 93 |
| 2B | 1.21 | 101 | 1.14 | 99 | 94 |
| 3B | 1.17 | 100 | 1.10 | 96 | 88 |
| 4B | 1.24 | 105 | 1.17 | 101 | 94 |
| 5B | 1.24 | 83 | 1.18 | 81 | 94 |
| 6B | 1.23 | 85 | 1.17 | 84 | 87 |
| 7B | 1.03 | 101 | 0.91 | 97 | 93 |
| 8B | 1.12 | 97 | 1.00 | 91 | 71 |
| 9B | 1.20 | 100 | 1.13 | 98 | 61 |
| Reference Example 1 | 1.24 | 104 | 1.17 | 101 | 93 |

As is apparent from the results given in Table 3, the batteries using the electrode substrates for a battery according to the present invention exhibited battery performance substantially equal to the battery using the conventional porous Ni body (Reference Example 1).

EXAMPLE B

A polyurethane foam having a thickness and a porosity as specified in Table 4 was provided as a starting material. It was impregnated and coated with a slurry prepared by mixing an Fe powder having an average particle size of 1 μm, an emulsion of a phenolic resin, CMC (dispersant), and water together in respective amounts of 60% by weight, 10% by weight (solid content), 1% by weight, and 29% by weight, and the coated polyurethane foam was dried at 120° C. for 10 min, thereby coating the polyurethane foam with an Fe powder. The polyurethane foam coated with the Fe powder was then heated and sintered in $H_2$ gas at 1200° C. for 20 min, thereby preparing a porous Fe body. The Fe powder contained impurity elements as listed in Table 4.

The porous Fe body was pickled under conditions specified in Table 4 before Ni plating. It was then plated with Ni using a Watts bath at a current density of 10 A/dm² for a period of time as specified in Table 4 and heat-treated in an $N_2$ gas atmosphere at a heat treatment temperature specified in Table 4 for 10 min, thereby preparing a metallic porous body having an Fe/Ni two-layer structure. Thus, 11 samples listed in Table 4 were prepared and evaluated for properties. The results are given in Table 5. In this example as well, for all the samples, the weight per unit area (areal density) was about 600 g/m². Data were collected in the same manner as in Example A. For the area proportion of exposed Fe, however, a simple method was used wherein the sample was immersed in a 1% aqueous hydrochloric solution for 5 min, the amount of Fe eluted by the immersion was measured by ICP (inductive coupling high frequency plasma spectroscopy), and the area proportion of exposed Fe was calculated based on the total surface area and the data for the amount of elution and the area of Fe portion determined using a standard sample of which the area of exposed Fe was known.

resultant electrodes were pressed at 1 ton/cm² into a size of 250 mm in longitudinal length X150 mm in lateral width X0.7 mm in thickness. Thereafter, angular enclosed nickel-hydrogen batteries were constructed in the same manner as in Example A. The batteries thus obtained were designated as battery Nos. 10B, 11B, 12B, . . . which correspond to the sample Nos. of the metallic porous bodies listed in Table 5. Further, as Reference Example 2, the above procedure was repeated to prepare a battery using a nickel electrode comprising the conventional porous Ni body. For each battery, the discharge voltage and the capacity were investigated at

TABLE 4

| Sample No. | Thickness of urethane (mm) | Number of pores in urethane (pores/cm) | Major impurity elements in Fe powder and concentration thereof (wt %) | Conditions for pickling before Ni plating | Plating time (min) | Tem. of heat treatment after plating(°C.) |
|---|---|---|---|---|---|---|
| 10 | 4 | 16 | C(0.01), O(0.2), Mn(0.5), Si(0.3) | In hydrochloric acid (5%), 5 min | 10 | 500 |
| 11 | 4 | 16 | C(0.01), O(0.2), Mn(0.5), Si(0.3) | In sulfuric acid (5%), 5 min | 10 | 500 |
| 12 | 4 | 16 | C(0.01), O(0.2), Mn(0.5), Si(0.3) | In sulfuric acid (1%), 5 min | 10 | 500 |
| 13 | 4 | 16 | C(0.01), O(0.2), Mn(0.5), Si(0.3) | None | 10 | 500 |
| 14 | 4 | 4 | C(0.01), O(0.2), Mn(0.5), Si(0.3) | In hydrochloric acid (3%), 5 min | 10 | 550 |
| 15 | 4 | 16 | C(0.1), O(0.2), Mn(2.5), Si(2.1) | In hydrochloric acid (3%), 5 min | 10 | 550 |
| 16 | 4 | 16 | C(0.01), O(0.2), Mn(0.5), Si(0.3) | In hydrochioric acid (3%), 5 min | 10 | 700 |
| 17 | 4 | 16 | C(0.01), O(0.2), Mn(0.1), Si(0.1) | In hydrochioric acid (3%), 5 min | 10 | 1000 |
| 18 | 4 | 16 | C(0.01), O(0.2), Mn(0.5), Si(0.3) | In hydrochloric acid (1%), 5 min | 0.3 | 550 |
| 19 | 4 | 16 | C(0.01), O(0.2), Mn(0.5), Si(0.3) | In hydrochioric acid (3%), 5 min | 20 | 550 |
| 20 | 1 | 16 | C(0.01), O(0.2), Mn(0.5), Si(0.3) | In hydrochioric acid (3%), 5 min | 10 | 550 |

TABLE 5

| Sample No. | Porosity (%) | Number of pores (pores/cm) | Area proportion of Fe-exposed portion(%) | Fe purity in skeleton portion (wt %) | Fe content in Ni layer (wt %) | Thickness of Ni layer (μm) | Electric resistance (mΩ) |
|---|---|---|---|---|---|---|---|
| 10 | 96 | 20 | 0.8 | 99 | 0.1 | 1.8 | 51 |
| 11 | 96 | 20 | 2.5 | 99 | 0.1 | 1.8 | 51 |
| 12 | 96 | 20 | 8.6 | 99 | 0.1 | 1.8 | 51 |
| 13 | 96 | 20 | 28 | 99 | 0.1 | 1.8 | 51 |
| 14 | 96 | 5 | 1.2 | 99 | 0.2 | 1.8 | 43 |
| 15 | 96 | 20 | 1.2 | 95 | 0.2 | 1.8 | 110 |
| 16 | 96 | 20 | 1.2 | 99 | 1.4 | 1.8 | 53 |
| 17 | 96 | 20 | 1.2 | 99 | 15 | 1.8 | 71 |
| 18 | 96 | 20 | 18 | 99 | 0.2 | 0.04 | 58 |
| 19 | 96 | 20 | 1.2 | 99 | 0.2 | 3.5 | 39 |
| 20 | 80 | 20 | 1.2 | 99 | 0.2 | 1.8 | 35 |

Metallic porous bodies listed in Table 5 were used to prepare nickel electrodes. As with the samples in Example A, the samples were filled with an active material composed mainly of nickel hydroxide, and the surface thereof was smoothed. They were then dried at 120° C. for 1 hr. The discharge currents of 10 A and 150 A in the same manner as in Example A. Further, each battery was tested on the service life by determining the retention of capacity after 500 charge-discharge cycles at a discharge current of 10 A. The results are given in Table 6.

TABLE 6

| Battery No. | Discharge at 10 A Voltage (V) | Discharge at 10 A Capacity (Ah) | Discharge at 150 A Voltage (V) | Discharge at 150 A Capacity (Ah) | Retention of capacity after 500 cycles (%) |
|---|---|---|---|---|---|
| 10B | 1.23 | 111 | 1.15 | 108 | 94 |
| 11B | 1.23 | 111 | 1.14 | 107 | 93 |
| 12B | 1.19 | 110 | 1.08 | 105 | 88 |
| 13B | 1.17 | 101 | 1.06 | 94 | 73 |
| 14B | 1.23 | 85 | 1.17 | 84 | 93 |
| 15B | 1.12 | 108 | 0.99 | 99 | 93 |
| 16B | 1.21 | 110 | 1.13 | 107 | 94 |
| 17B | 1.11 | 108 | 0.98 | 98 | 88 |
| 18B | 1.15 | 103 | 1.03 | 95 | 69 |
| 19B | 1.24 | 112 | 1.16 | 109 | 94 |
| 20B | 1.24 | 81 | 1.17 | 79 | 94 |
| Reference Example 2 | 1.24 | 112 | 1.17 | 108 | 94 |

As is apparent from the results given in Table 6, the batteries using the electrode substrates for a battery according to the present invention exhibited battery performance substantially equal to the battery using the conventional porous Ni body (Reference Example 2). The sample Nos. 13B and 18B wherein the proportion of the area of exposed Fe was large exhibited markedly lowered retention of the capacity, demonstrating that the elution of Fe affected the service life. As shown in Tables 4 and 5, the effect of reducing the area of exposed iron was particularly significant when pickling was carried out before Ni plating. Further, it is also apparent that the area of exposed Fe is influenced by Ni plating time.

EXAMPLE C

The porous body of iron used as the sample 10 in Example B was treated in the same steps until the completion of the Ni plating, except that only the plating time was shortened. As a result, the plating thickness was 1.3 µm. Thereafter, the heat treatment after the plating was conducted under 5 conditions specified in Table 7. A group of samples treated under different conditions were classified into sample Nos. 21 to 25.

The properties of the resultant metallic porous bodies having an Fe/Ni two-layer structure were investigated. The results were as given in Table 7. In this case, the thickness of the iron-diffused layer is the thickness for a region where the iron content of Ni was not less than 1.0%. The thickness was measured by line analysis of the cross-section of the skeleton of the porous body having a nickel/iron two-layer structure according to Auger electron spectroscopy (space resolving power 0.1 µm). The mechanical properties were measured using a sample having a width of 15 mm, and the electric resistance was measured using a sample having a width of 10 mm and a length of 100 mm.

TABLE 7

| Sample No. | Area proportion of Fe-exposed portion (%) | Heat treatment conditions Heat treatment temperature (°C.) | Heat treatment conditions Heat treatment time (min) | Thickness of Fe-diffused layer ($D_{Fe}$) (µm) | Thickness of Fe-diffused layer/thickness of Ni layer ($D_{Fe}/T_{Ni}$) | Mechanical strength Tensile strength (kgf/15 mm) | Mechanical strength Elongation (%) | Electric resistance (mΩ) |
|---|---|---|---|---|---|---|---|---|
| 21 | 0.5 | 600 | 5 | 0.5 | 0.38 | 4.2 | 3.5 | 55 |
| 22 | 0.9 | 650 | 5 | 0.8 | 0.62 | 3.8 | 2.8 | 61 |
| 23 | 1.2 | 650 | 20 | 0.8 | 0.62 | 3.7 | 2.8 | 61 |
| 24 | 1.2 | 750 | 10 | 1.2 | 0.92 | 3.3 | 1.2 | 81 |
| 25 | 1.2 | 550 | 30 | 0.6 | 0.46 | 3.9 | 3.3 | 56 |

As is apparent from the results shown in Table 7, the difference in area of exposed Fe between samples was not so large as to affect the mechanical properties. Larger thickness of the iron-diffused layer was likely to cause deterioration in mechanical properties (lowered strength and lowered elongation). Further, it was likely to increase the electric resistance. Based on the above results, the heat treatment temperature and time ranges which can provide a product usable as an electrode substrate for batteries were determined and limited to at most 700° C. for the heat treatment temperature and limited to 1 to 30 min for the heat treatment time.

Metallic porous body samples (sample Nos. 21 to 25) listed in Table 7 were used to prepare batteries in the same manner as in Example A. The battery samples thus obtained were designated as sample Nos. 21B to 25B which correspond to the sample Nos. of the metallic porous bodies.

In this case, sample No. 24B caused breaking in many sites of the skeleton during filling of an active material and pressing. No unfavorable phenomena were observed for the other samples.

As is apparent from the above results, although heat treatment after nickel plating can impart workability to Ni constituting the surface layer, excessive heat treatment increases electric resistance and, at the same time, results in deteriorated mechanical strength.

Further, as Reference Example 3, a battery was prepared in the same manner as described above in connection with the above samples, except that a nickel electrode using the conventional porous body of Ni was used.

For each battery, the discharge voltage and the capacity were investigated at discharge currents of 10 A and 150 A. Further, each battery was tested on the service life by determining the retention of capacity after 500 charge-discharge cycles at a discharge current of 10 A. The results are given in Table 8.

TABLE 8

| Battery No. | Discharge at 10 A | | Discharge at 150 A | | Retention of capacity after 500 cycles |
| --- | --- | --- | --- | --- | --- |
| | Voltage (V) | Capacity (Ah) | Voltage (V) | Capacity (Ah) | (%) |
| 21B | 1.23 | 111 | 1.15 | 108 | 92 |
| 22B | 1.22 | 111 | 1.13 | 107 | 92 |
| 23B | 1.21 | 110 | 1.12 | 106 | 90 |
| 24B | 1.20 | 103 | 1.08 | 100 | 90 |
| 25B | 1.21 | 109 | 1.14 | 105 | 91 |
| Reference Example 3 | 1.23 | 111 | 1.17 | 108 | 92 |

As is apparent from the results given in Table 8, the electrode substrates, according to the present invention, which had been heat-treated so as to satisfy a relationship represented by the following formula exhibited battery performance substantially equal to the battery (Reference Example 3) using the conventional porous body of Ni:

$$0 < D_{Fe}/T_{Ni} \leq 0.65$$

wherein $T_{Ni}$ represents the thickness of the nickel coating layer and $D_{Fe}$ represents the thickness of a diffused layer of iron diffused into the nickel coating layer.

The electrode substrate, for a battery, using a metallic porous body having an Fe/Ni two-layer structure according to the present invention has performance not unfavorably comparable with the electrode substrate using Ni, and, since iron rich in resources is used, can supply an epochal material in the battery industry which has a great demand for batteries. Further, according to the process of the present invention, a substrate having excellent electric resistance, mechanical resistance, and corrosion resistance can be easily prepared by regulating the ratio of the thickness of a diffused layer of iron diffused into a nickel coating layer to the thickness of the nickel coating layer to a desired value.

What is claimed is:

1. An electrode substrate, for a battery, as a support for an active material used in a collector for a battery, comprising a metallic porous structure possessing interconnecting pores with porosity of not less than 90% and a number of pores per cm of not less than 10 and having an Fe/Ni two-layer structure wherein Fe constitutes the interior of a skeleton having been prepared using a porous resin or a nonwoven fabric of a carbon fiber as a starting substrate material and removing the porous resin or carbon fiber nonwoven fabric after forming an Fe layer of a porous body constituting the porous structure with the surface portion of the skeleton coated with Ni.

2. The electrode substrate for a battery according to claim 1, wherein the surface area of Fe portion exposed in the Fe/Ni two-layer structure occupies not more than 10% of the total surface area of the porous body.

3. The electrode substrate for a battery according to claim 1, wherein in the Fe/Ni two-layer structure, the thickness $T_{Ni}$ of the nickel coating layer and the thickness $D_{Fe}$ of a diffused layer of iron diffused into the nickel coating layer satisfies a relationship represented by the following formula (1):

$$0 < D_{Fe}/T_{Ni} \leq 0.65 \qquad (1).$$

4. The electrode substrate for a battery according to claim 1, wherein the Fe content in the Ni coating layer is not more than 10% by weight.

5. The electrode substrate for a battery according to claim 1, wherein not less than 98% by weight of the interior of the Fe skeleton is constituted by Fe.

6. The electrode substrate for a battery according to claim 1, wherein the thickness of the nickel coating layer excluding the Fe exposed portion is 0.1 to 10 μm.

7. A process for preparing an electrode substrate for a battery, comprising:

forming a metallic porous body of iron using a porous resin or a non-woven fabric of a carbon fiber as a substrate and heat treating the resulting product to remove the porous resin or non-woven fabric of carbon fiber; plating the metallic porous body with nickel to form an Ni coating layer; heat-treating the plated metallic porous body to regulate the ratio of the thickness of a diffused layer of iron diffused into the nickel coating layer to the thickness of the nickel coating layer to not more than 0.65.

8. The process for preparing an electrode substrate for a battery according to claim 7, wherein the metallic porous body of iron is prepared by coating the porous resin as the substrate with a metallic powder of Fe and sintering the coated substrate.

* * * * *